United States Patent [19]

Mallick et al.

[11] Patent Number: 5,802,340
[45] Date of Patent: Sep. 1, 1998

[54] METHOD AND SYSTEM OF EXECUTING SPECULATIVE STORE INSTRUCTIONS IN A PARALLEL PROCESSING COMPUTER SYSTEM

[75] Inventors: Soummya Mallick; Rajesh B. Patel, both of Austin, Tex.

[73] Assignee: International Business Machines Corporation, Armonk, N.Y.

[21] Appl. No.: 518,000

[22] Filed: Aug. 22, 1995

[51] Int. Cl.$^6$ .................................................. G06F 9/38
[52] U.S. Cl. .................................................. 395/394
[58] Field of Search .................................... 395/392, 394

[56] References Cited

U.S. PATENT DOCUMENTS

| | | | |
|---|---|---|---|
| 4,980,857 | 12/1990 | Walter et al. | 395/183.21 |
| 4,992,938 | 2/1991 | Cocke et al. | 395/393 |
| 5,113,521 | 5/1992 | McKeen et al. | 395/182.13 |
| 5,113,523 | 5/1992 | Colley et al. | 395/800.12 |
| 5,155,831 | 10/1992 | Emma et al. | 711/121 |
| 5,155,843 | 10/1992 | Stamm et al. | 395/182.03 |
| 5,185,871 | 2/1993 | Frey et al. | 395/381 |
| 5,293,613 | 3/1994 | Hayden et al. | 395/182.13 |
| 5,345,567 | 9/1994 | Hayden et al. | 395/569 |
| 5,377,336 | 12/1994 | Eickemeyer et al. | 395/383 |
| 5,467,473 | 11/1995 | Kahle et al. | 395/800.23 |
| 5,611,063 | 3/1997 | Loper et al. | 395/381 |
| 5,615,350 | 3/1997 | Hesson et al. | 395/394 |
| 5,627,984 | 5/1997 | Gupta et al. | 395/376 |

FOREIGN PATENT DOCUMENTS

| | | | |
|---|---|---|---|
| 0568842 | 4/1993 | European Pat. Off. | G06F 9/45 |
| 9324738 | 12/1993 | WIPO | F01L 13/06 |

OTHER PUBLICATIONS

IBM Technical Disclosure Bulletin vol. 11 No. 11, Apr. 1969; pp. 1571–1573.

IBM Technical Disclosure Bulletin vol. 32 No. 8A, Jan. 1990; pp. 373–375.

IBM Technical Disclosure Bulletin vol. 33 No. 5, Oct. 1990; p. 23.

IBM Technical Disclosure Bulletin vol. 34 No. 1, Jun. 1991; pp. 370–374.

IBM Technical Disclosure Bulletin vol. 37 No. 6A, Jun. 1994; pp. 261–264.

IBM Technical Disclosure Bulletin vol. 37 No. 6B, Jun. 1994; pp. 285–294.

IBM Technical Disclosure Bulletin vol. 38 No. 1, Jan. 1995; pp. 79–82.

*Primary Examiner*—Parshotam S. Lall
*Assistant Examiner*—Kenneth R. Coulter
*Attorney, Agent, or Firm*—Sawyer & Associates; Casimer K. Salys

[57] ABSTRACT

A method for speculatively performing store instructions in a parallel processing computer system, the computer system including a completion buffer unit, includes comparing statuses between a first store instruction and at least one second instruction in the completion buffer unit, the at least one second instruction scheduled for completion before the first store instruction, and speculatively completing the first store instruction before the at least one second instruction when the statuses of the first store instruction do not conflict with the at least one second instruction. In another method aspect, speculatively performing store instructions includes forming a general purpose register (GPR) allocation deallocation table, the table including status fields for a plurality of instructions in a completion buffer unit, comparing the status fields of each of the plurality of instructions to a store instruction of the plurality of instructions, and speculatively completing the store instruction when the status fields for the store instruction do not conflict with the status fields for the plurality of instructions.

10 Claims, 4 Drawing Sheets

| CB | S | E | W | INSTRUCTION | G0 | G1 | G2 | G3 | G4 | G5 | G6 | G7 | G8 | G9 | G10 | G11 | | G31 |
|----|---|---|---|-------------|----|----|----|----|----|----|----|----|----|----|-----|-----|---|-----|
| 4  |   |   |   |             |    |    |    |    |    |    |    |    |    |    |     |     |   |     |
| 3  | 0 | 1 | 0 | stwx r06,r07,r08 | | | | | | | | | | | | | | |
| 2  | 0 | 0 |   | eqv r04,r03,r02  | | | | | | | 1 | | | | | | | |
| 1  | 0 | 0 |   | nand r03,r03,r02 | | | | | 1 | | | | | | | | | |
| 0  | 0 | 0 |   | add r06,r04,r01  | | | | | | | 1 | | | | | | | |

FIGURE 2

| CB | S | E | W | INSTRUCTION | G0 | G1 | G2 | G3 | G4 | G5 | G6 | G7 | G8 | G9 | G10 | G11 | | G31 |
|----|---|---|---|-------------|----|----|----|----|----|----|----|----|----|----|-----|-----|---|-----|
| 4  |   |   |   |             |    |    |    |    |    |    |    |    |    |    |     |     |   |     |
| 3  |   |   |   |             |    |    |    |    |    |    |    |    |    |    |     |     |   |     |
| 2  | 0 | 1 | 1 | stwx r06,r07,r08 | | | | | | | | | | | | | | |
| 1  | 0 | 0 |   | eqv r04,r03,r02  | | | | | | 1 | | | | | | | | |
| 0  | 0 | 0 |   | nand r03,r03,r02 | | | | 1 | | | | | | | | | | |

FIGURE 3

| CB | S | E | W | INSTRUCTION | G0 | G1 | G2 | G3 | G4 | G5 | G6 | G7 | G8 | G9 | G10 | G11 | | G31 |
|---|---|---|---|---|---|---|---|---|---|---|---|---|---|---|---|---|---|---|
| 4 | | | | | | | | | | | | | | | | | | |
| 3 | 0 | 1 | 0 | stwx r06,r07,r08 | | | | | | | | | | | | | | |
| 2 | 0 | 0 | | add r04,r03,r02 | | | | | | 1 | | | | | | | | |
| 1 | 0 | 0 | | nand r03,r03,r02 | | | | | 1 | | | | | | | | | |
| 0 | 0 | 1 | | ibzx r05,r04,r01 | | | | | | 1 | | | | | | | | |

FIGURE 4

| CB | S | E | W | INSTRUCTION | G0 | G1 | G2 | G3 | G4 | G5 | G6 | G7 | G8 | G9 | G10 | G11 | | G31 |
|---|---|---|---|---|---|---|---|---|---|---|---|---|---|---|---|---|---|---|
| 4 | | | | | | | | | | | | | | | | | | |
| 3 | | | | | | | | | | | | | | | | | | |
| 2 | 0 | 1 | 1 | stwx r06,r07,r08 | | | | | | | | | | | | | | |
| 1 | 0 | 0 | | add r04,r03,r02 | | | | | | 1 | | | | | | | | |
| 0 | 0 | 0 | | nand r03,r03,r02 | | | | | 1 | | | | | | | | | |

FIGURE 5

| CB | S | E | W | INSTRUCTION | G0 | G1 | G2 | G3 | G4 | G5 | G6 | G7 | G8 | G9 | G10 | G11 | | G31 |
|----|---|---|---|---|----|----|----|----|----|----|----|----|----|----|----|----|----|----|
|    |   |   |   |             |    |    |    |    |    |    |    |    |    |    |     |     |  |     |
| 4  | 1 | 1 | 0 | stwx r06,r07,r08 | | | | | | | | | | | | | | |
| 3  | 1 | 0 |   | eqv r04,r03,r02  | | | | | 1 | | | | | | | | | |
| 2  | 1 | 0 |   | nand r03,r03,r02 | | | | 1 | | | | | | | | | | |
| 1  | 1 |   |   | bclr[EQ]         | | | | | | | | | | | | | | |
| 0  | 0 | 0 |   | add r06,r04,r01[EQ] | | | | | | | 1 | | | | | | | |

FIGURE 6

| CB | S | E | W | INSTRUCTION | G0 | G1 | G2 | G3 | G4 | G5 | G6 | G7 | G8 | G9 | G10 | G11 | | G31 |
|----|---|---|---|---|----|----|----|----|----|----|----|----|----|----|----|----|----|----|
|    |   |   |   |             |    |    |    |    |    |    |    |    |    |    |     |     |  |     |
| 3  | 0 | 1 | 1 | stwx r06,r07,r08 | | | | | | | | | | | | | | |
| 2  | 0 | 0 |   | eqv r04,r03,r02  | | | | | 1 | | | | | | | | | |
| 1  | 0 | 0 |   | nand r03,r03,r02 | | | | 1 | | | | | | | | | | |
| 0  | 0 |   |   | bclr             | | | | | | | | | | | | | | |

FIGURE 7

METHOD AND SYSTEM OF EXECUTING SPECULATIVE STORE INSTRUCTIONS IN A PARALLEL PROCESSING COMPUTER SYSTEM

FIELD OF THE INVENTION

The present invention relates to parallel processing, and more particularly to speculative processing of store instructions in a parallel processing computer system.

BACKGROUND OF THE INVENTION

The design of microprocessing systems has been focused on increasing the speed at which processing occurs in order to provide faster and more powerful computer systems. An important type of processor that achieves the desired increase in speed is a reduced instruction set computer (RISC) processor. These processors typically provide increased computing ability, since RISC processors are well-suited for parallel processing of instructions.

In some situations, parallel processing proceeds speculatively. Speculative instruction processing generally refers to processing an instruction on a predicted path of execution prior to the resolution of a condition on that path. Speculative executions typically reduce delays of completing the instructions. However, in some situations, speculative execution is typically not done due to the number of conditions that may exist that would render the results of the speculative instruction invalid. Included in these situations is a speculative store instruction.

Accordingly, there exists a need for processing store instructions speculatively in a parallel processing computer system.

SUMMARY OF THE INVENTION

The present invention provides method aspects to meet this need. In one aspect, a method for speculatively performing store instructions in a parallel processing computer system, the computer system including a completion buffer unit, includes comparing statuses between a first store instruction and at least one second instruction in a completion buffer unit, the at least one second instruction scheduled for completion before the first store instruction, and speculatively completing the first store instruction before the at least one second instruction when the statuses of the first store instruction do not conflict with the at least one second instruction.

In a further aspect, the statuses include status bit fields in a table of bit fields with the status bit fields comprising at least one general purpose register (GPR) status bit field, a speculative status field, and an exception field. The method further includes not speculatively storing when the GPR bit field status is in conflict, when the exception bit field status is in conflict, or when the speculation bit field status is in conflict.

In another aspect, a wait bit field status for the first store instruction is set when the first store instruction is performed speculatively. Additionally, the set wait bit field status halts external interrupts until the first store instruction is completed.

In another method aspect, speculatively performing store instructions in a parallel processing computer system includes forming a general purpose register (GPR) allocation deallocation table, the table including status fields for a plurality of instructions in a completion buffer unit, comparing the status fields of each of the plurality of instructions to a store instruction of the plurality of instructions, and speculatively completing the store instruction when the status fields for the store instruction do not conflict with the status fields for the plurality of instructions.

In a further aspect, the status fields includes a speculative status, an exception status, and a general purpose register (GPR) status for each of the plurality of instructions. In addition, the table includes a completion buffer number field with the completion buffer number indicating an order of completion for the plurality of instructions. In one aspect, the store instruction has a lowest completion buffer number.

With the present invention, processing efficiency is improved due to the achievement of speculative execution of a store instruction. Thus, bottlenecks in the load store unit normally caused when the unit must wait for the store instruction to reach the bottom of the completion buffer are reduced.

These and other advantages of the aspects of the present invention will be more fully understood in conjunction with the following detailed description and accompanying drawings.

BRIEF DESCRIPTION OF THE DRAWINGS

FIG. 2 illustrates an embodiment of a GPR allocation deallocation table in accordance with the present invention.

FIG. 3 illustrates the GPR allocation deallocation table of FIG. 2 in a next processor cycle.

FIG. 4 illustrates an embodiment of a GPR allocation deallocation table in accordance with the present invention.

FIG. 5 illustrates the GPR allocation deallocation table of FIG. 4 in a next processor cycle.

FIG. 6 illustrates an embodiment of a GPR allocation deallocation table in accordance with the present invention.

FIG. 7 illustrates the GPR allocation deallocation table of FIG. 6 in a next processor cycle.

DETAILED DESCRIPTION

Figure 1:
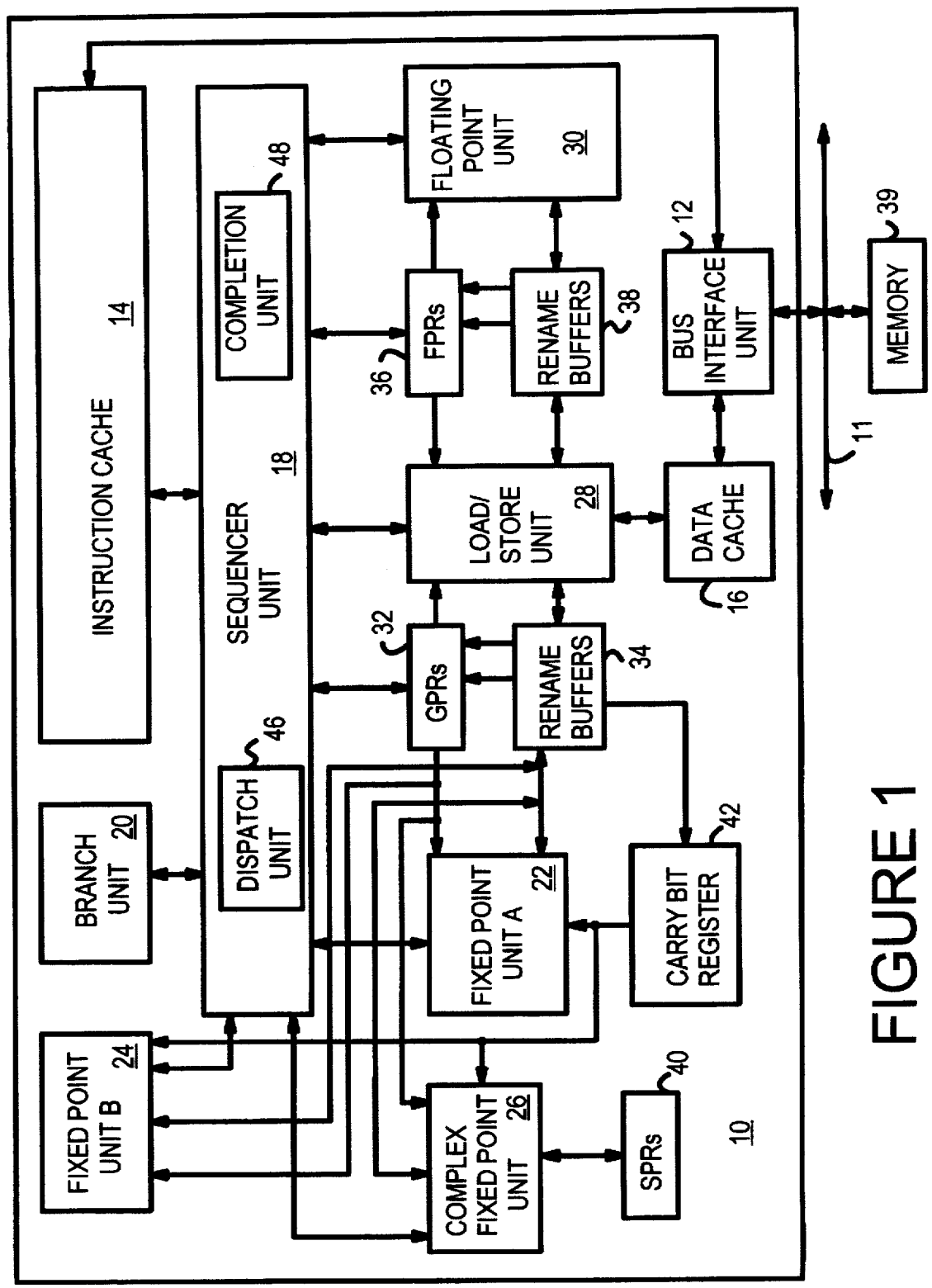
FIG. 1 illustrates a block diagram of a parallel processing computer system in accordance with the present invention.

The present invention relates to effectively processing speculative store instructions in a superscalar computer system. The following description is presented to enable one of ordinary skill in the art to make and use the invention and is provided in the context of a patent application and its requirements. Various modifications to the preferred embodiment and the generic principles and features described herein will be readily apparent to those skilled in the art.

An exemplary embodiment of the present invention and its advantages is better understood by referring to FIGS. 1–6 of the drawings, like numerals being used for like and corresponding parts of the accompanying drawings.

FIG. 1 is a block diagram of a processor system 10 for processing information according to the preferred embodiment. In the preferred embodiment, processor 10 is a single integrated circuit superscalar microprocessor, such as the PowerPCT™ processor from IBM Corporation, Austin, Tex. Accordingly, as discussed further hereinbelow, processor 10 includes various units, registers, buffers, memories, and other sections, all of which are formed by integrated circuitry. Also, in the preferred embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches through a dispatch unit 46 the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "pipelining". In a significant aspect of the preferred embodiment, an instruction is normally processed as six stages, namely fetch, decode, dispatch, execute, completion, and writeback.

In the preferred embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions. In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

The GPR value of the Store instruction is typically not renamed and early completion of Store instructions is not usually achievable. Store instructions therefore are normally required to be the oldest instructions in the processor, i.e., the oldest instruction in the completion unit buffer, to ensure that the GPR value in the store instruction is valid. Thus, when a store instruction finishes accessing the MMU to check for protection miss violations of the memory being accessed and no misses protections are determined, the LSU has an unnecessary bottleneck while waiting for the store instruction to become the oldest instruction in the completion unit buffer.

In order to improve system performance and to better utilize the parallel processing ability of the superscalar processor 10, the present invention presents a method and system for achieving speculative store instruction completion. A speculative instruction preferably refers to an instruction that is on a predicted path which has a condition that has not yet been resolved. The speculative instruction may be executed if the branch predicted correctly or may be canceled if the branch predicted incorrectly. A faultable instruction preferably refers to an instruction which is executing ahead of the machine, i.e., ahead of the program counter, and a prior instruction has not signaled completion yet. When the prior instruction does not cause an exception, the faultable instruction is allowed to complete. However, when the prior instruction does cause an exception, the faultable instruction does not change any architectural state or the cache. These conditions, therefore, need to be monitored in order to complete store instructions without requiring the store instruction to be the last in the completion buffer unit.

Accordingly, in one embodiment of the present invention, a GPR allocation deallocation table is developed and maintained in hardware, for example, to allow early completion of store instructions with valid data. FIGS. 2–6 illustrate several examples of the GPR table 50 to exemplify various conditions that are monitored to ensure proper execution of a speculative store instruction. These examples are meant to be illustrative and not restrictive and are developed for use in accordance with the PowerPC™ architecture. Of course, other superscalar processors may have other conditions to be checked and accordingly, these conditions may also be included, when suitable, in the table.

As shown in FIGS. 2–6, the table 50 includes several fields. A first field CB represents a completion buffer number, as determined by the order of the instructions in the completion buffer. A second field S represents a speculative instruction bit. A third field E represents an exception bit, while a fourth field W represents a wait bit. The table further includes an instruction field and fields for bits representing each of the GPRs (which, for a PowerPC™, is 32 registers). The data for the S, E, and GPR bit fields is suitably obtained from the instruction encoding, the contents of which are system dependent, as is well understood by those skilled in the art.

Referring to FIG. 2, in one embodiment, table 50 includes four instructions. According to the CB number associated with each instruction, the first instruction scheduled for completion is an add instruction with a CB number of 0. A second instruction to be completed is a nand instruction with a CB number of 1. A third instruction to be completed is an eqv (equivalent) instruction with a CB number of 2. A last instruction to be completed is a stwx (store word conditional indexed) instruction with a CB number of 3. The bits for the speculative, exception, and wait status indicate that the stwx instruction is the only instruction in the completion buffer that may cause an exception. An exception suitably refers to a mechanism that allows the processor to change to a supervisor state for execution with the information about the state of the processor saved to particular registers and execution from a predetermined address according to the exception that occurred.

The bits for the GPRs reveal that the current instruction scheduled for completion, the add instruction, utilizes GPR 6. Because the add instruction may affect the contents of the GPR 6 and the stwx also uses GPR 6, the stwx cannot be performed speculatively before the add due to the register conflict.

During a next cycle, as shown in FIG. 3, when the add instruction has been completed, the conflict of GPR 6 between the add and stwx instructions is removed. Since none of the other instructions ahead of the stwx instruction are exception causing or speculative, the stwx instruction may now be performed speculatively ahead of these other instructions. Since the store instruction is being performed speculatively, the wait status bit is set high so that no external interrupts can be taken until the wait bit reaches the bottom of the completion buffer, which, in this example, is after two more instructions have been completed.

In another example, FIG. 4 illustrates another set of instructions in the completion buffer during a particular cycle. These instructions, in order of their scheduled completion and increasing CB number, are lbzx (load byte and zero indexed), nand, add, and stwx. In this example, the add and stwx do not conflict in utilization of a GPR. However, the lbzx instruction can cause an exception, as indicated by the set bit in the exception status field. Thus, the store instruction cannot be completed speculatively ahead of the load.

As shown in FIG. 5, once the lbzx instruction is completed in a next instruction cycle, the exception causing instruction is removed from the completion buffer. Thus, the stwx instruction may now be completed speculatively since there are no register conflicts and no speculative instructions ahead of the store in the completion buffer. Again, since the store instruction is being performed speculatively, the wait status bit is set high so that no external interrupts can be taken until the wait bit reaches the bottom of the completion buffer.

As another example, FIG. 6 illustrates the table 50 with another set of instructions. The instructions in the order of their scheduled completion are an add, a bclr (branch conditional to link register), a nand, an eqv, and a stwx instruction. In this example, the store instruction cannot be performed speculatively, because there is an unresolved branch instruction, bclr, waiting for the execution of the add. Thus, the bclr, nand, eqv and stwx instructions are speculative instructions, as indicated by the "1"in the S field for each of the instructions. Thus, the outcome of these instructions may or may not be realized, depending on the branches taken. Therefore, the store instruction must wait until the add instruction that resolves speculation is executed and the status bit fields updated to reflect the speculation resolution.

Once the add instruction is completed in a next instruction cycle, the table 50, as shown in FIG. 7, reflects the updated statuses for the remaining instructions. The store instruction can now be performed speculatively, because there are no conflicts, i.e., no register conflicts and no exception causing or speculative instructions as indicated by the low bits in the S and E fields of the other instructions. Again, the W bit for the store instruction is set high so that no external interrupts can be taken until the wait bit reaches the bottom of the completion buffer.

With the present invention, a GPR allocation table provides the status of the store instruction compared with the status of other instructions in a completion buffer to determine whether a store instruction may be executed speculatively. Speculative execution of a store instruction effectively reduces bottlenecks in the load store unit normally caused when the unit must wait for the store instruction to reach the bottom of the completion buffer. Thus, the present invention achieves better overall efficiency for parallel processing systems.

Although the present invention has been described in accordance with the embodiments shown, one of ordinary skill in the art will recognize that there could be variations to the embodiment and those variations would be within the spirit and scope of the present invention. For example, although specific instructions have been used to describe the operations of the present invention, the situations these instructions present are meant to be general and thus, other instructions may provide similar restrictions in performing speculative stores. Accordingly, many modifications may be made by one of ordinary skill without departing from the spirit and scope of the present invention, the scope of which is defined by the following claims.

We claim:

1. A method for speculatively performing store instructions in a parallel processing computer system, the computer system including a completion buffer unit, the method comprising:

comparing a plurality of statuses between a first store instruction and at least one second instruction in a completion buffer unit, the statuses further comprising a plurality of status bit fields in a table of bit fields, the plurality of status bit fields including at least one general purpose register (GPR) status bit field, a speculative status field, and an exception field, the at least one second instruction scheduled for completion before the first store instruction and being capable of being other than a second store instruction; and speculatively completing the first store instruction before the at least one second instruction when the plurality of statuses of the first store instruction do not conflict with the plurality of statuses of the at least one second instruction.

2. The method of claim 1 wherein the step of speculatively storing is not done when the GPR bit field status is in conflict.

3. The method of claim 2 wherein the step of speculatively storing is not done when the exception bit field status is in conflict.

4. The method of claim 1 wherein the step of speculatively storing is not done when the speculation bit field status is in conflict.

5. The method of claim 1 wherein a wait bit field status for the first store instruction is set when the first store instruction is performed speculatively.

6. The method of claim 5 wherein the set wait bit field status halts external interrupts until the first store instruction is completed.

7. A method for speculatively performing store instructions in a parallel processing computer system, the computer system including a completion buffer unit, the method comprising:

forming a general purpose register (GPR) allocation deallocation table, the table including status fields for a plurality of instructions in the completion buffer unit, the plurality of instructions capable of including an instruction other than store instructions, the status fields comprising speculative status, exception status, and a general purpose register (GPR) status for each of the plurality of instructions;

comparing the status fields of each of the plurality of instructions to a store instruction of the plurality of instructions; and speculatively completing the store instruction when the status fields for the store instruction do not conflict with the status fields for the plurality of instructions.

8. The method of claim 7 wherein the table further includes a completion buffer number field.

9. The method of claim 8 wherein the completion buffer number indicates an order of completion for the plurality of instructions.

10. The method of claim 9 wherein the store instruction has a lowest completion buffer number.

* * * * *